CONSTANT-IMPEDANCE VARIABLE-DELAY TRANSMISSION LINE

Filed Feb. 7, 1968 2 Sheets-Sheet 1

Inventors
Ednor M. Rowe
Richard H. Hilden
Roland A. Anderson
Attorney

Inventors
Ednor M. Rowe
Richard H. Hilden
Attorney

United States Patent Office 3,543,192

Patented Nov. 24, 1970

3,543,192
CONSTANT-IMPEDANCE VARIABLE-DELAY TRANSMISSION LINE

Ednor M. Rowe, McFarland, Wis., and Richard H. Hilden, Minneapolis, Minn., assignors to the United States of America as represented by the United States Atomic Energy Commission Filed Feb. 7, 1968, Ser. No. 703,653
Int. Cl. H03h 7/36
U.S. Cl. 333—29 2 Claims

ABSTRACT OF THE DISCLOSURE

A constant-impedance variable-delay transmission line includes a plurality of semiconductor voltage-variable capacitors connected to a variable-voltage source. A plurality of first windings are each magnetically coupled with an associated one of a plurality of ferrite cores and electrically connected to a variable-current source. A plurality of second windings are each magnetically coupled with an associated one of the ferrite cores and are connected with an associated one of the semiconductor voltage-variable capacitors to form sections of a transmission line whose inductance to capacitance ratio may be maintained constant while varying the propagation velocity characteristics thereof.

CONTRACTUAL ORIGIN OF THE INVENTION

The invention described herein was made in the course of, or under, a contract with the U.S. Atomic Energy Commission.

BACKGROUND OF THE INVENTION

This invention relates to means for providing variable time delays for electrical signals and more particularly to artificial transmission line means for providing a variable time delay for an applied signal.

In the electrical art, when operating upon a signal, it is often necessary to delay the signal in time. This may be effected by passing the signal through a transmission line which delays the signal in time an amount proportional to the propagation velocity of the transmission line. Thus, to vary the amount of delay in time of an applied signal, the values of inductance and capacitance forming the transmission line are changed whereby the propagation velocity thereof is varied. To insure fidelity in transmitting a signal, the characteristic impedance of the transmission line should match the characteristic impedance of the system to which the transmission line is coupled. Present transmission lines, providing a variable time delay to an applied signal, are generally of the distributed type and require large physical size for large time delays. Further, they embody mechanical structure to effect a variable propagation velocity and require a long time lapse to adjust the transmission line to the desired time delay characteristics.

It is therefore one object of the present invention to provide an improved transmission line for variably delaying in time a signal applied thereto.

It is another object of the present invention to provide a transmission line for variably delaying in time a signal applied thereto while maintaining a constant characteristic impedance.

It is another object of the present invention to provide a transmission line having a constant characteristic impedance and a time delay variable responsive to an electrical signal.

It is another object of the present invention to provide a transmission line having a large variable time delay and minimal size.

It is another object of the present invention to provide a transmission line having a time delay whose value may be changed rapidly while maintaining the characteristic impedance of the transmission line constant.

Other objects of the present invention will become more apparent as the detailed description proceeds.

SUMMARY OF THE INVENTION

In general, the present invention comprises current-variable inductive means and voltage-variable capacitive means connected to form sections of an electric transmission line. A variable-voltage source and a variable-current source are connected to said capacitive and inductive means, respectively, to maintain the inductance to capacitance ratio of the electric transmission line constant while varying the propagation velocity characteristics thereof.

BRIEF DESCRIPTION OF THE DRAWINGS

Further understanding of the present invention may best be obtained from consideration of the accompanying drawings wherein.

An electric transmission line may be divided into sections, each of which sections includes inductance and capacitance. The characteristic impedance of the electric transmission line may be represented by the formula $$Z_C=\sqrt{\frac{L}{C}}$$

where $Z_C$=the characteristic impedance of the transmission line, L=the inductance per section of the transmission line and C=the capacitance per section of the transmission line. As an electrical signal is passed through a transmission line, the transmission line delays the signal an amount of time T. The time T is equal to $N\sqrt{LC}$, where N=the number of sections in the transmission line, L=the inductance per section of the transmission line and C=the capacitance per section of the transmission line. If either the inductance or capacitance (L or C) is varied to change the delay time of a signal passing through the transmission line, then the characteristic impedance $Z_C$ of the transmission line must change. However, if both the inductance and capacitance (L and C) change such that their product is varied while their ratio remains constant, then the characteristic impedance $Z_C$ of the transmission line remains constant while the time delay of a signal passing through the transmission line is changed. Thus, the delay time of a signal passing through the transmission line may be varied without destroying the impedance match of the transmission line to the electrical system to which it is coupled, thereby maintaining maximum signal fidelity.

Figure 1:
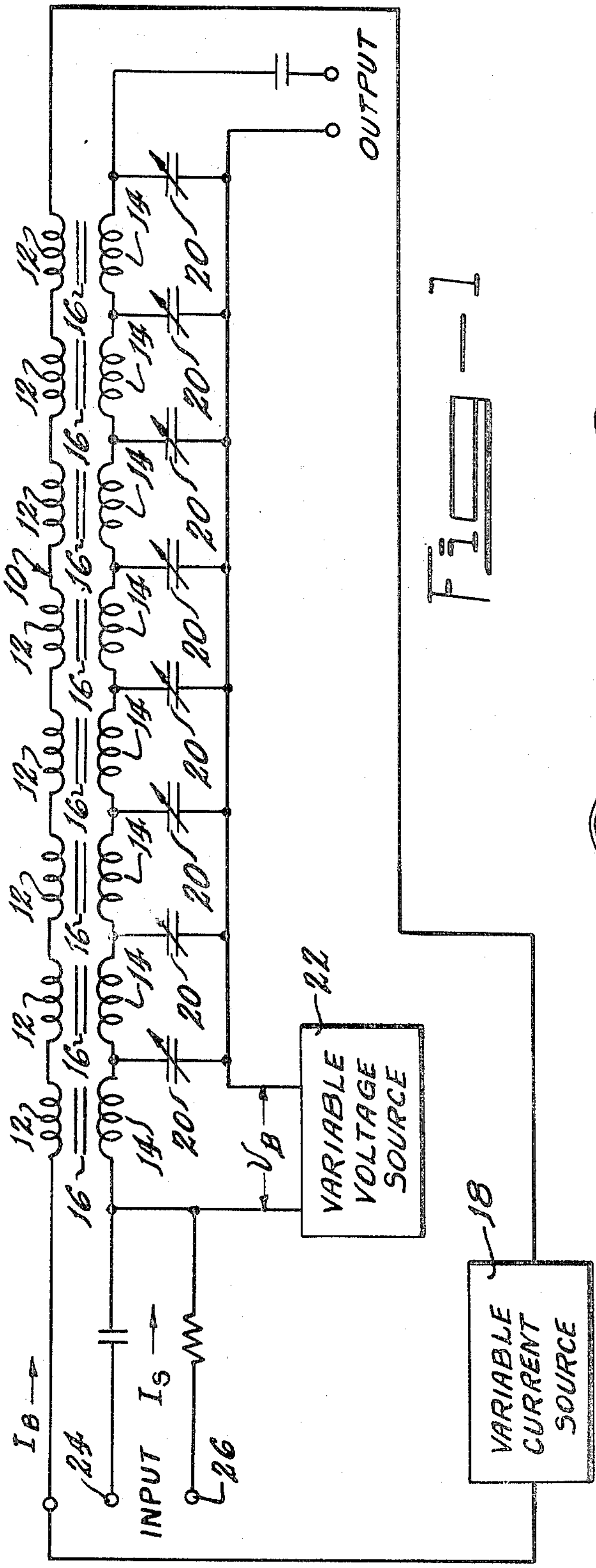
FIG. 1 is a schematic diagram of a general apparatus for the practice of the present invention.

Reference is made to FIG. 1 wherein is shown a typical transmission line 10 embodying the present invention. Coils 12 and 14 are each wound on an associated ferrite core 16. A D-C supply 18 is connected so that a bias current $I_B$ flows serially through each of the coils 12. The bias current $I_B$ flowing through the coils 12 changes the incremental permeability of the associated ferrite cores 16, whereby the inductance value of the associated coils 14 is caused to vary. Thus, by varying the bias current $I_B$, the inductance of the coils 14 may be changed. Between each of the coils 14 is connected a voltage-variable capacitor 20, such as a semiconductor capacitor. A bias voltage $V_B$ from a D-C supply 22 is applied to each of the capacitors 20 to effect a change in the capacitance thereof responsive to the value of the applied bias voltage.

Each of the coils 14 and capacitors 20 form a section of the electric transmission line 10. The signal to be delayed, $I_S$, is applied as shown to the input terminals 24 and 26 of the transmission line 10. By changing the bias current $I_B$ and bias voltage $V_B$ at the same time, the ratio of inductance to capacitance of the transmission line sections may be maintained constant while the product of the inductance and capacitance is made to change. Thus, the time delay occasioned an applied signal $I_S$ to the transmission line 10 may be varied while the characteristic imepdance of the transmission line is maintained constant. The change in the inductance-capacitance product of the transmission line 10 can be typically made, with the structure of the present invention, as great as a factor of 100 with a resulting change in delay time to an applied signal of a factor of 10, while the characteristic impedance of the transmission line is maintained at a constant value.

DESCRIPTION OF THE PREFERRED EMBODIMENT

Figure 2:
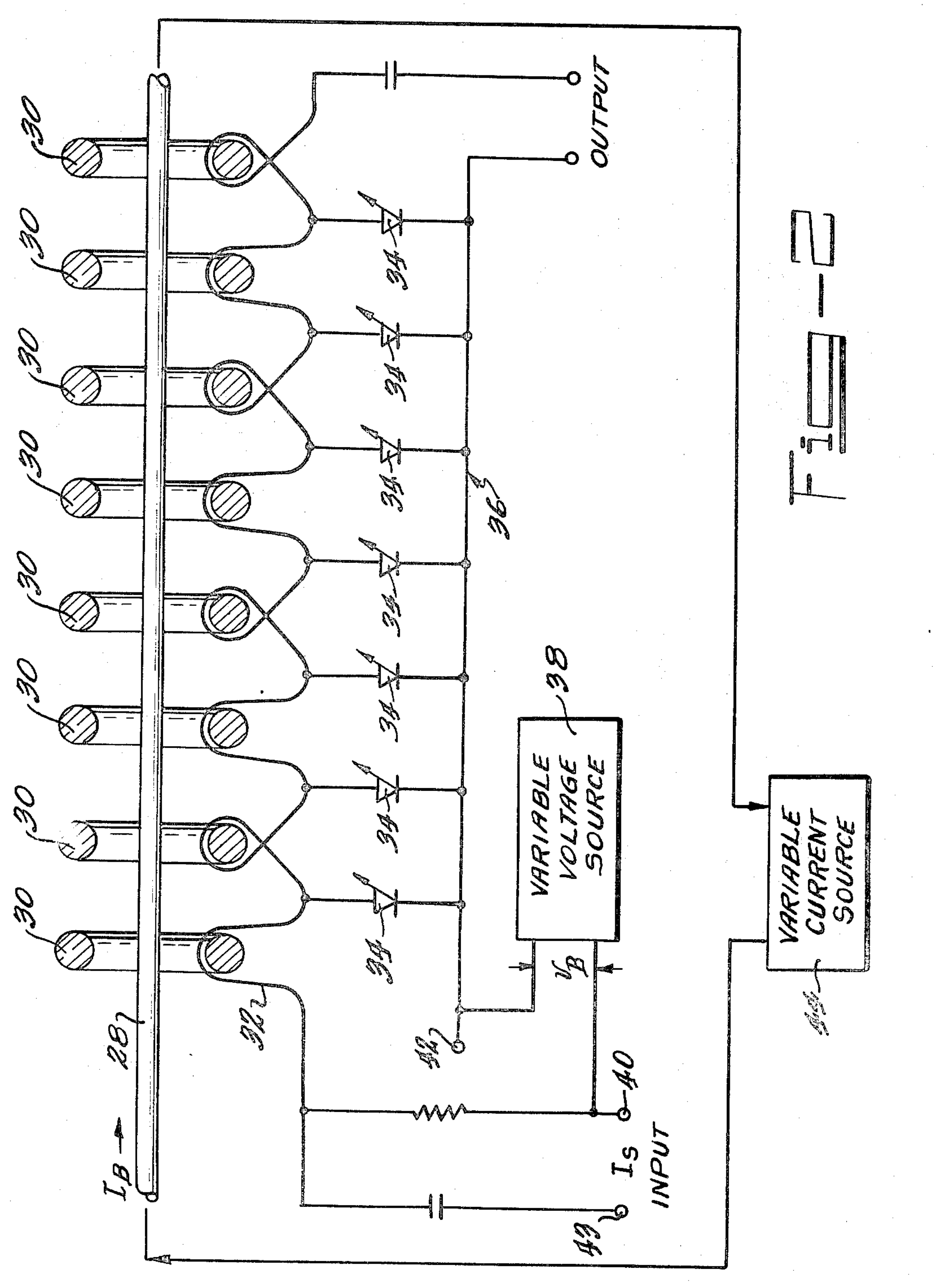
FIG. 2 is a schematic diagram of the preferred embodiment for the practice of the present invention.

Turning to FIG. 2, the preferred embodiment according to the present invention is shown. In the embodiment of FIG. 2, an electrical conductor 28 is passed through the center of a plurality of toroidal ferrite cores 30 so as to be magnetically coupled therewith. An electrical conductor 32 is wound about the cores 30 in the manner illustrated; that is, for each alternate ferrite core 30 the winding direction of electrical conductor 32 is reversed. A plurality of semiconductor voltage-variable capacitors 34, such as Vericaps, are each connected between an associated winding of conductor 32 and electrical ground. The inductance of each winding of electrical conductor 32 and the capacitance of the associated capacitor 34 form a section of the delay line 36.

A bias voltage $V_B$ from a D-C supply 38 is applied to the semi-conductor capacitors 34 via terminals 40 and 42. A bias current $I_B$ from a D-C supply 44 is applied to the electrical conductor 28. The signal to be delayed in time is applied between terminals 40 and 43.

In operation, the capacitance of the semiconductor capacitors 34 and the inductance of the winding formed by electrical conductor 32 are varied by changing the bias voltage and current applied respectively thereto. As previously described, the bias voltage and current may be varied so that the ratio of inductance to capacitance remains constant, while the product of inductance and capacitance changes, whereby a constant characteristic impedance $Z_C$ for the transmission line 36 is effected and a variable time delay is provided for a signal applied thereto. In the embodiment of FIG. 2, it is important that the sense of the windings of conductor 32 be alternated so that the bias current $I_B$ and the applied signal current $I_S$ are adequately decoupled.

Figure 3:
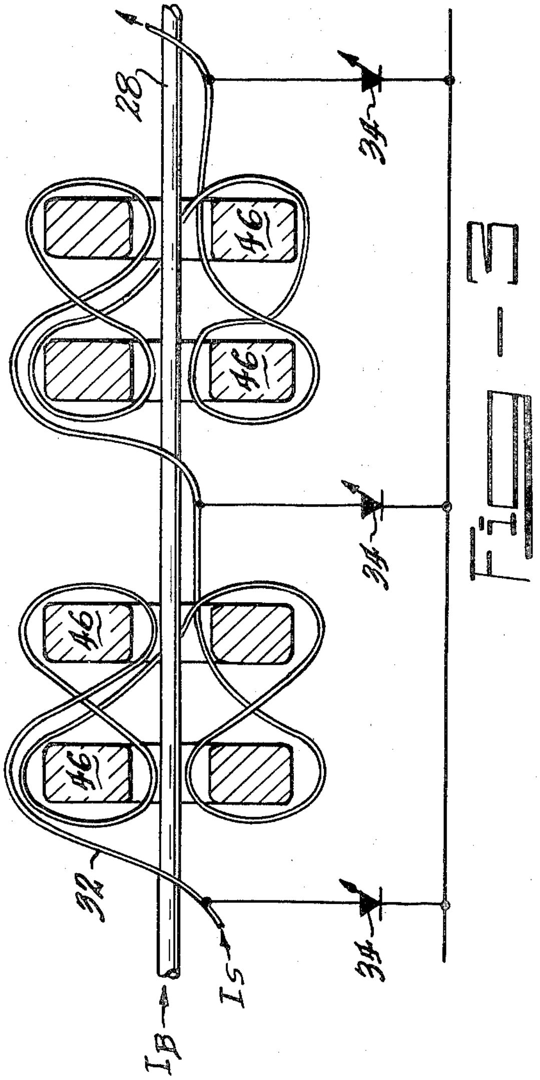
FIG. 3 is a schematic diagram of an alternate embodiment for a portion of the apparatus of FIG. 2.

It is to be noted in the embodiment of FIG. 2 that, to maintain the alternating sense of the winding of electrical conductor 32, it is necessary that the embodiment have an even number of ferrite cores 30 and hence an even number of sections for the transmission line 36. Where it is desired that the transmission line 36 embody an odd number of sections, construction according to the embodiment of FIG. 3 may be followed. The embodiment of FIG. 3 is the same as that for FIG. 2 except that for each of the ferrite cores 30 in FIG. 2 a pair of ferrite cores 46 are provided in FIG. 3. Further, the electrical conductor 32 is wound about each pair of ferrite cores 46 in a figure-eight pattern as shown. With this figure-eight winding pattern, the coupling to a winding that links both the associated pairs of cores 46 in the same sense is essentially zero. Thus, the applied signal being delayed in time, $I_S$, is effectively decoupled from the bias current $I_B$.

It is to be appreciated that in the structure of the present invention the inductance and capacitance, and hence the propagation velocity, of the transmission line are changed electrically and that fast response to effect desired delay time changes for an applied signal may easily be obtained. Further, following the teachings of the present invention, a transmission line having variable time delay characteristics may be constructed having a relatively small size for large time delay variations.

Where the incremental permeability as a function of bias current for the ferrite cores matches the capacity as a function of bias voltage of the voltage-variable capacitors, a single current source may be used to vary the inductance of the cores and the capacitance of the capacitors. A resistor inserted in the output of the current source develops the bias voltage for the voltage-variable capacitors.

Persons skilled in the art will, of course, readily adapt the general teachings of the invention to embodiments far different from the embodiments illustrated. Accordingly, the scope of the protection afforded should not be limited to the particular embodiments illustrated in the drawings and described above, but should be determined only in accordance with the appended claims.

The embodiments of the invention in which an exclusive property or privilege is claimed are defined as follows:

1. A constant-impedance variable-delay transmission line comprising variable-output power source means, electrically-variable capacitive means, a plurality of toroidal ferrite cores, an electrical conductor mounted to pass through the center of each of said ferrite cores in magnetic coupling relationship therewith, a plurality of windings each wound about an associated one of said ferrite cores in the same sense for alternate ferrite cores, means for connecting said windings and said electrically-variable capacitive means to form sections of an electric transmission line, and means electrically connecting said power source means to said capacitive means and said electrical conductor respectively to maintain the inductance to capacitance ratio of said electric transmission line constant while varying the propagation velocity characteristics thereof.

2. A constant-impedance variable-delay transmission line comprising variable-output power source means, electrically-variable capacitive means, a plurality of toroidal ferrite cores, an electrical conductor mounted to pass through the center of each of said ferrite cores in magnetic coupling relationship therewith, a plurality of serially connected windings each wound about an associated pair of said ferrite cores in a figure-eight pattern, means for connecting said windings and said electrically-variable capacitive means to form sections of an electric transmission line, and means electrically connecting said power source means to said capacitive means and said electrical conductor respectively to maintain the inductance to capacitance ratio of said electric transmission line constant while varying the propagation velocity characteristics thereof.

References Cited

UNITED STATES PATENTS

| | | | |
|---|---|---|---|
| 3,147,542 | 9/1964 | Knight | 333—29 |
| 3,046,500 | 7/1962 | Dewitz | 333—29 |
| 3,243,769 | 3/1966 | Trott | 340—10 |
| 3,022,472 | 2/1962 | Tannenbaum | 333—18 |

ELI LIEBERMAN, Primary Examiner

CHARLES BARAFF, Assistant Examiner

U.S. Cl. X.R.

333—18, 84; 340—10